Patented Aug. 26, 1947

2,426,379

UNITED STATES PATENT OFFICE 2,426,379

CELLULOSE ACETATE COATING COMPOSITIONS

Robert C. Swain, Riverside, and Pierrepont Adams, Stamford, Conn., assignors to American Cyanamid Company, New York, N. Y., a corporation of Maine No Drawing. Application September 20, 1940, Serial No. 357,612

1 Claim. (Cl. 260—15)

This invention relates to coating compositions containing cellulose acetate and melamine-formaldehyde resins.

An object of this invention is to improve the physical and chemical properties of cellulose acetate coating compositions, e. g., water resistance, acid resistance, etc.

Another object of this invention is to provide compositions containing cellulose acetate and compatible proportions of compatible melamine-formaldehyde resins.

These and other objects are attained by blending cellulose acetate with not more than about 10% (total solids weight basis) of a melamine-formaldehyde resin which has been alkylated with an alcohol containing from 3–8 carbon atoms and wherein the molal ratio of formaldehyde to melamine is at least about 4:1.

The following examples in which the proportions are in parts by weight are given by way of illustration and not in limitation.

EXAMPLE 1

| | Parts |
|---|---|
| Melamine-formaldehyde resin "A" | 10 |
| Cellulose acetate | 90 |

A composition containing these ingredients is prepared by admixing 20 parts of melamine-formaldehyde resin "A" solution (50% resin) with 600 parts of "cellulose acetate stock solution" (containing 15% of cellulose acetate, 70% of acetone and 15% of ethyl acetate). Films of the composition are applied to metal objects and baked at a temperature of about 135° C. for about one-half hour. The product is a hard, transparent coating having good film strength.

EXAMPLE 2

| | Parts |
|---|---|
| Melamine-formaldehyde resin "B" | 10 |
| Cellulose acetate | 90 |

A composition containing these ingredients is prepared by admixing 20 parts of melamine-formaldehyde resin "B" solution (50% resin) with 600 parts of "cellulose acetate stock solution." Films of the composition are applied to metal objects and baked at a temperature of about 135° C. for about one-half hour. A clear, tough film is formed.

EXAMPLE 3

| | Parts |
|---|---|
| Melamine-formaldehyde resin "C" | 10 |
| Cellulose acetate | 90 |

A composition containing these ingredients is prepared by admixing 20 parts of melamine-formaldehyde resin "C" solution (50% resin) with 600 parts of "cellulose acetate stock solution." Films of the composition are applied to metal objects and baked at a temperature of about 135° C. for about one-half hour. The product formed is a very hard, clear coating.

EXAMPLE 4

| | Parts |
|---|---|
| Melamine-formaldehyde resin "D" | 10 |
| Cellulose acetate | 90 |

A composition containing these ingredients is prepared by admixing 20 parts of melamine-formaldehyde resin "D" solution (50% resin) with 600 parts of "cellulose acetate stock solution." Films of the composition are applied to metal objects and baked at a temperature of about 135° C. for about one-half hour. A water-white film having good chemical properties is formed.

EXAMPLE 5

| | Parts |
|---|---|
| Melamine-formaldehyde resin "E" | 10 |
| Cellulose acetate | 90 |

A composition containing these ingredients is prepared by admixing 20 parts of melamine-formaldehyde resin "E" solution (50% resin) with 600 parts of "cellulose acetate stock solution." Films of the composition are applied to metal objects and baked at a temperature of about 135° C. for about one-half hour. A water-white hard film is produced.

EXAMPLE 6

The composition of Example 3 may be mixed with about an equal proportion of a fatty oil modified phthalic glyceride resin and the resulting mixture is emulsified in water. This emulsion may be applied to cloth or paper either as a finishing material, sizing material or in textile printing processes. The resin may be cured by subjecting the coated or impregnated material to a temperature of about 135° C. for several minutes.

EXAMPLE 7

The composition of Example 2, optionally with a small proportion, e. g., 10%, of a suitable plasticizer such as diethyl phthalate or dibutyl phthalate is applied to sheets of glass which are to be bonded together to form a safety glass or the like. After a film of the composition has been applied the volatile solvent is permitted to evaporate at room temperature or if desirable the films may be partially dried in an oven at about 80–100° C. When sufficient solvent has been removed so that the film is tacky or dry, the sheets of coated glass are superimposed and pressed, preferably at a temperature of 100–150° C. for from several minutes to about one hour under a pressure of 100 pounds per square inch or more. The resulting laminated glass product has excellent properties since the bond shows improved water resistance. The product retains its clear, colorless appearance over a long period of time and is less subject to deterioration due to weather than safety glass prepared from ordinary cellulose acetate compositions. Variations well known in the art of producing safety glass may be adapted to our compositions and process.

EXAMPLE 8

The composition of Example 1, preferably with about 1 part of phosphoric acid or acid ester thereof added, is applied to wood and baked at about 80° C. for about 1–4 hours. A hard, clear lacquer finish is obtained.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "D"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "E"*

|  | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93–95° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous, the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, the hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., the monoethyl ether of ethylene glycol ("Cellosolve"), acetone, ethyl acetate, etc., may be added to the original solutions of cellulose acetate and melamine-formaldehyde resin in order to produce perfectly clear solutions if such solutions are not originally obtained.

While formaldehyde has been used in the previous examples, it will be obvious that other aldehydes such as the various polymers of formaldehyde, e. g., paraformaldehyde, or substances which yield formaldehyde may be used in place of part or all of the formaldehyde.

The melamine-formaldehyde resins may be alkylated with individual alcohols or mixtures of alcohols including not only those used in the above examples, but also the propanols, isomers of n-butyl alcohol and n-hexyl alcohol, the octanols and ethylene chlorhydrin. The term "alkylated melamine-formaldehyde resin" is intended to denote compositions which are reacted with an alcohol.

As indicated by the above examples, cellulose acetate has been found to be compatible with melamine-formaldehyde resins wherein the molal ratio of formaldehyde to melamine is about 4:1 up to 6:1. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine.

Improvements in cellulose acetate compositions are attained in accordance with our invention by including from about 1% to about 10% of alkylated melamine resin in such compositions.

Films of our mixed cellulose acetate-alkylated melamine-formaldehyde compositions have good dielectric strength, good light stability and show improved resistance to heat and have a much better water and acid resistance than cellulose acetate compositions not containing melamine-formaldehyde resin. The melamine-formaldehyde resin-cellulose acetate films are considerably less soluble than cellulose acetate films not containing the melamine-formaldehyde resin. This is of advantage in many instances as in the treatment of textiles and in the production of lacquer films.

Our products are especially useful in the manufacture of electrical insulation, particularly when combined with alkyds. They are also useful in the production of safety glass, glass substitutes, as well as in lacquers, paints and enamels.

Our compositions may also be used in admixture with other resinous compositions, e. g., urea-formaldehyde resins, phenol-formaldehyde resins, ethyl cellulose, nitrocellulose, etc.

A wide variety of plasticizers may be incorporated into our products such as the alkyl phthalates, tricresyl phosphate, various alkyd resins, particularly the fatty oil acid modified resins, etc. Mixtures of our compositions with about an equal part of a fatty oil modified alkyd resin, e. g., linseed oil modified phthalic glyceride resin, are especially useful for use in coating compositions.

Various fillers, pigments, dyes and lakes may be added to our compositions, e. g., lithopone, zinc oxide, titanium oxide, ferric oxide, Prussian blue, toluidine red, malachite green, mica, ground glass, glass fibers, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Obviously many modifications and variations in the processes and compositions described above may be made without departing from the spirit and scope of the invention as defined in the appended claim.

We claim:

A coating composition which is an aqueous emulsion of about 10 parts of a melamine-formaldehyde resin prepared by reacting one mol of melamine with 6 mols of formalin and reacting the condensation product thereof with butanol, about 90 parts of cellulose acetate and about 100 parts of a fatty oil modified phthalic glyceride resin.

ROBERT C. SWAIN.
PIERREPONT ADAMS.

REFERENCES CITED

The following references are of record in the file of this patent:

UNITED STATES PATENTS

| Number | Name | Date |
|---|---|---|
| 1,815,444 | Moss | July 21, 1931 |
| 1,977,642 | Moss | Oct. 23, 1934 |
| 1,963,142 | Moss | June 19, 1934 |
| 2,197,357 | Widmer | Apr. 16, 1940 |
| 2,218,474 | Moore | Oct. 15, 1940 |

OTHER REFERENCES

"Vinylite Resins, series V resins for surface coatings," page 11, pub. April 1940, by Carbide and Carbon Chem. Corp., New York.

Certificate of Correction

Patent No. 2,426,379.

August 26, 1947.

ROBERT C. SWAIN ET AL.

It is hereby certified that errors appear in the printed specification of the above numbered patent requiring correction as follows: Column 1, line 48, for the word "touch" read *tough*; column 2, line 4, for "atnd" read *and*; and that the said Letters Patent should be read with these corrections therein that the same may conform to the record of the case in the Patent Office.

Signed and sealed this 14th day of October, A. D. 1947.

[SEAL]

THOMAS F. MURPHY,
*Assistant Commissioner of Patents.* are, for instance, phosphoric acid, ammonium salts of phosphoric acid, etc.

Obviously many modifications and variations in the processes and compositions described above may be made without departing from the spirit and scope of the invention as defined in the appended claim.

We claim:

A coating composition which is an aqueous emulsion of about 10 parts of a melamine-formaldehyde resin prepared by reacting one mol of melamine with 6 mols of formalin and reacting the condensation product thereof with butanol, about 90 parts of cellulose acetate and about 100 parts of a fatty oil modified phthalic glyceride resin.

ROBERT C. SWAIN.
PIERREPONT ADAMS.

REFERENCES CITED

The following references are of record in the file of this patent:

UNITED STATES PATENTS

| Number | Name | Date |
|---|---|---|
| 1,815,444 | Moss | July 21, 1931 |
| 1,977,642 | Moss | Oct. 23, 1934 |
| 1,963,142 | Moss | June 19, 1934 |
| 2,197,357 | Widmer | Apr. 16, 1940 |
| 2,218,474 | Moore | Oct. 15, 1940 |

OTHER REFERENCES

"Vinylite Resins, series V resins for surface coatings," page 11, pub. April 1940, by Carbide and Carbon Chem. Corp., New York.

---

Certificate of Correction

Patent No. 2,426,379.          August 26, 1947.

ROBERT C. SWAIN ET AL.

It is hereby certified that errors appear in the printed specification of the above numbered patent requiring correction as follows: Column 1, line 48, for the word "touch" read *tough*; column 2, line 4, for "atnd" read *and*; and that the said Letters Patent should be read with these corrections therein that the same may conform to the record of the case in the Patent Office.

Signed and sealed this 14th day of October, A. D. 1947.

[SEAL]

THOMAS F. MURPHY,
*Assistant Commissioner of Patents.*